(12) United States Patent
Solvang et al.

(10) Patent No.: US 11,976,000 B2
(45) Date of Patent: May 7, 2024

(54) EXPANDABLE SILICA PARTICLES AND METHODS FOR MAKING AND USING THE SAME

(71) Applicant: VALUNOR AG, Zug (CH)

(72) Inventors: Finn Erik Solvang, Noetteroey (NO); Norman Blank, Rueschlikon (CH)

(73) Assignee: VALUNOR AG, Zug (CH)

( * ) Notice: Subject to any disclaimer, the term of this patent is extended or adjusted under 35 U.S.C. 154(b) by 0 days.

(21) Appl. No.: 17/896,412

(22) Filed: Aug. 26, 2022

(65) Prior Publication Data

US 2023/0023633 A1    Jan. 26, 2023

Related U.S. Application Data

(63) Continuation-in-part of application No. PCT/IB2021/053936, filed on May 10, 2021, and a
(Continued)

(30) Foreign Application Priority Data

May 10, 2020 (NO) .................................. 20200545
Jun. 4, 2020 (NO) .................................. 20200660

(51) Int. Cl.
*C03C 11/00* (2006.01)
*C03B 19/10* (2006.01)
*F27B 3/06* (2006.01)

(52) U.S. Cl.
CPC .......... *C03C 11/002* (2013.01); *C03B 19/108* (2013.01); *F27B 3/06* (2013.01); *F27M 2003/09* (2013.01)

(58) Field of Classification Search
CPC ..... C03C 11/002; C03C 1/002; C03B 19/108; C04B 14/24; C04B 20/002; C01B 33/126
See application file for complete search history.

(56) References Cited

U.S. PATENT DOCUMENTS

| | | |
|---|---|---|
| 2,255,237 A | 9/1941 | Willis |
| 2,582,852 A | 1/1952 | Shoemaker |

(Continued)

FOREIGN PATENT DOCUMENTS

| | | |
|---|---|---|
| CN | 101880128 A | 11/2010 |
| FR | 2354301 A1 | 1/1978 |

(Continued)

OTHER PUBLICATIONS

Adhikary et al., Expanded glass as light-weight aggregate in concrete—A review, Journal of Cleaner Production 313 (Elsevier, Jun. 8, 2021) 127848, pp. 1-17.

(Continued)

*Primary Examiner* — Bryan D. Ripa
*Assistant Examiner* — Cameron K Miller
(74) *Attorney, Agent, or Firm* — LELKES IP; Robert Lelkes (57) ABSTRACT

The present disclosure concerns expandable silica particles having a coating comprising talc powder and kaolin powder provided on the outer surface of the expandable silica particle and expandable and expanded silica particles comprising silica fume and/or ultrafine quartz silica sand beneath the surface of the particles. Methods for producing expandable and expanded silica particles are disclosed, including a method using a vibration plate and a furnace having a vibration plate for carrying out that method. The expanded silica particles have high compressive strength, substantially uniform cell size and distribution, low water absorption, and low porosity on the outer surface. They are useful as a filler in matrix materials, like concrete or epoxy, as insulation material with various binder materials, and as water filtration medium.

9 Claims, 5 Drawing Sheets

Related U.S. Application Data continuation-in-part of application No. PCT/IB2021/053938, filed on May 10, 2021.

(56) References Cited

U.S. PATENT DOCUMENTS

| | | | |
|---|---|---|---|
| 2,691,248 A | 10/1954 | Ford | |
| 2,883,347 A | 4/1959 | Fisher et al. | |
| 4,075,025 A | 2/1978 | Rostoker | |
| 4,198,224 A | 4/1980 | Kirkpatrick | |
| 4,208,367 A | 6/1980 | Wunning | |
| 4,234,330 A | 11/1980 | Taupin et al. | |
| 4,347,326 A | 8/1982 | Iwami et al. | |
| 4,552,577 A | 11/1985 | Varshneya et al. | |
| 4,769,057 A | 9/1988 | Smolenski et al. | |
| 2002/0073898 A1 | 6/2002 | Schelinski | |
| 2002/0104810 A1 | 8/2002 | Dejaiffe et al. | |
| 2003/0084683 A1 | 5/2003 | Dejaiffe et al. | |
| 2009/0146108 A1* | 6/2009 | Datta ............ C03C 11/002 521/50 |
| 2019/0256422 A1 | 8/2019 | Solvang | |

FOREIGN PATENT DOCUMENTS

| | | | | |
|---|---|---|---|---|
| GB | 679704 A | | 9/1952 | |
| JP | S61236621 A | | 10/1986 | |
| JP | H07138045 A | | 5/1995 | |
| JP | 2004307226 A | * | 11/2004 | ............ Y02W 30/91 |
| JP | 2004307226 A | | 11/2004 | |
| SU | 1139701 A1 | | 2/1985 | |
| WO | 2011087373 A1 | | 7/2011 | |
| WO | 2015169749 A1 | | 11/2015 | |
| WO | 2016041899 A1 | | 3/2016 | |
| WO | 2016120374 A1 | | 8/2016 | |
| WO | 2019002561 A1 | | 1/2019 | |
| WO | WO-2019002561 A1 | * | 1/2019 | ............ C03C 1/026 |

OTHER PUBLICATIONS

K. Vishal, "Utilization of Waste Glass, Fly Ash, Metakaolin and Silica Fumes in Paver Blocks" (Aug. 2019) Civil Engineering Department, Thapar Institute of Engineering & Technology (a deemed to be university), Patiala, Punjab, India.

* cited by examiner

EXPANDABLE SILICA PARTICLES AND METHODS FOR MAKING AND USING THE SAME

CROSS-REFERENCE TO RELATED APPLICATIONS

This application is a continuation-in-part of international patent application no. PCT/IB2021/053936 filed on 10 May 2021 and is a continuation-in-part of international patent application no. PCT/IB2021/053938 filed on 10 May 2021. Each of international patent application no. PCT/IB2021/053936 and international patent application no. PCT/IB2021/053938 claims priority based on Norwegian patent application no. 20200545 filed on 10 May 2020 and Norwegian patent application no. 20200660 filed on 4 Jun. 2020.

TECHNICAL FIELD

The present disclosure concerns expandable silica particles, expanded silica particles, methods for making expandable and expanded silica particles and a furnace for producing expanded silica particles.

BACKGROUND

Expanded silica particles are utilized in various areas, for example as a filler in matrix materials, like concrete, or as a loose-fill aggregate material, such, as insulation material with various binder materials, or as water filtration medium. Several advantageous physical properties are associated with expanded silica particles, such as low density, low water absorption rate, high dimensional stability, excellent compression strength, and high insulation capacity. Expanded silica particles added to a matrix material may also improve the processability of the matrix material before hardening, for instance by improving flowability at very low water adsorption, and reduced shrinkage of the matrix. Additionally, expanded silica particles may reduce overall material costs, in particular for expensive matrix materials. Finally, by utilizing post-consumer recycled glass, expanded silica materials contribute to environmental sustainability.

Expanded silica particles may be produced from recycled glass powder, water glass, one or more expanding agents and optionally metakaolin or further additives. These constituents are mixed to form a slurry, granulated into expandable silica particles and subsequently dried. The dried, expandable silica particles are then expanded in a furnace, such as a rotary kiln, at a temperature of 780° C.-950° C. Alternatively, expansion may take place at temperatures above 850° C., when silicon carbide is used as the expanding agent, in a two-stage sintering process. During the production of expanded silica particles, it is desirable to utilize high temperatures, at which the expanding silica particles are close to the transition from a plastic state to a molten state. At these temperatures the material of the expanding silica particles provides least resistance to the ongoing expansion. Problems in commonly used processes may, however, arise due to the expanding silica particles being close to the transition from the plastic state to the molten state. Close to this transition, silica particles are in a softened state.

A problem arising for softened silica particles is the expanding silica particles are more prone to adhere to one another, and to the surrounding furnace in which the particles are expanded. This problem is particularly pronounced when large numbers of particles are expanded simultaneously in the furnace, in order to achieve large production volumes. To prevent particle adhesion, the expandable silica particles may be coated with a release agent, such as kaolin powder. At or above 850° C. however, kaolin transforms into metakaolin at temperatures close to the plastic-molten transition and may thereby lose most of its properties as a release agent. The metakaolin may also melt into the surface of the softened expanding silica particles, thereby further reducing its effectiveness as a release agent.

These effects are amplified at higher processing temperatures and with increasing amounts of silicon carbide (SiC) as expanding agent. Excess heat due to the exotherm reaction in the particles, driven by exothermic expanding agents such as SiC, lowers the particle viscosity and softens the particle surface. Thereby, additional metakaolin may melt into the silica particle surface and the release agent effectiveness is further reduced.

Furthermore, due to the low viscosity at temperatures close to the transition from the plastic state to the molten state, the interior cell walls may rupture, leading to an open-pored internal structure, whereas cells at the outer surface of the expanding silica particles may collapse. When using kaolin coating as a release agent, the surface of the expanding silica particles may additionally become more brittle, leading to a further risk of collapse of cells at the outer surface and consequently a deterioration in physical properties. In particular, such expanded silica particles tend to have lower compressive strength with increasing particle size.

These effects may lead to both weakened expanded silica particles and to an increased capacity of the expanded silica particles to adsorb fluids, such as water. Especially when used as a filler in a matrix material, like an organic or inorganic binder, a high adsorption capacity may cause the expanded silica particles to adsorb large quantities of the matrix material. Such an adsorption of matrix material negatively affects the properties of the expanded silica particles as a filler material. For instance, adsorbing concrete additives, such as a water reducer or air entrainment agent, will have significant impact on flow behavior and mechanical properties in the cured state. This counteracts the desired effect of lowering the overall material density of matrix and filler.

Consequently, there is a clear need for an improved expandable silica particle, which can be expanded at a temperature close to the plastic-molten transition, while reducing the risk of adhesion of softened expandable silica particles to one another and/or to the furnace and reducing the risk of rupturing of internal cell walls and the risk of collapse of cells at the outer surface and for a method and a device for expansion of silica particles at high temperatures, wherein the risk of adhesion of softened particles to one another and/or to the furnace is significantly reduced. In addition, there is a clear need for a method and a device for expansion of silica particles at high temperatures, wherein the risk of adhesion of softened particles to one another and/or to the furnace is significantly reduced.

SUMMARY OF THE INVENTION

One aspect of the invention is an expandable silica particle dry-coated with kaolin powder and talc powder, a method for producing the same and expanded silica particles made with the same.

Another aspect of the invention is an expandable silica particle comprising a sintered mixture of (a) silica powder, (b) an expanding agent and (c) silica fume and/or ultrafine quartz silica sand, a method for producing the same and expanded silica particles comprising silica fume and/or ultrafine quartz silica sand in the core of the expanded silica particles.

A further aspect of the invention is a method for producing expanded silica particles from expandable silica particles having an expanding agent by feeding expandable silica particles to at least one vibration plate while heating the expandable silica particles to a temperature above the activation temperature of the expanding agent to form expanded silica particles, wherein the vibration plate is vibrated by a vibration engine at a maximum acceleration of at least 3 g at a stroke angle greater than 0° with respect to the vertical direction and/or at a stroke length of 1 to 7 mm and/or such that each and every difference in acceleration between any two points on the vibration plate is not greater than 1.5 g.

Yet a further aspect of the invention is a furnace for producing expanded silica particles from expandable silica particles, wherein the furnace comprises a bottom, at least one vibration plate located at, or proximal to, the bottom of the furnace, and at least one vibration engine operatively connected to the vibration plate for vibrating the vibration plate, wherein the at least one vibration engine is configured to vibrate the vibration plate at a maximum acceleration of at least 3 g at a stroke angle greater than 0° with respect to the vertical direction and/or at a stroke length of 1 to 7 mm and/or such that each and every difference in acceleration between any two points on the vibration plate is not greater than 1.5 g to preferably create a vibratory fluid bed condition for the expandable silica particles

DETAILED DESCRIPTION OF THE INVENTION

An expandable silica particle according to the disclosure comprises (a) silica powder, (b) at least one expanding agent and (c) optionally, silica fume and/or ultrafine quartz silica sand, which the inventors found acts as reinforcement agent. The silica powder, at least one expanding agent and, optionally, silica fume and/or ultrafine quartz silica sand, are preferably sintered or heat-pressed as further described below. The expandable silica particle preferably further comprises a coating provided on the outer surface of the expandable silica particle, wherein the coating comprises kaolin powder and talc powder. Advantageously, kaolin acts as a release agent, whereas talc offsets the negative effects of kaolin at high temperatures by rendering the outer surface of the expanding silica particle more elastic and with closed cells. Optionally, the expandable silica particle may comprise further additives, such as a coloring agent The expandable silica particle preferably comprises at least 50, more preferably at least 60, up to 99, more preferably up to 98, wt.-% silica powder. The particles of the silica powder preferably have a diameter of at least 0.01, more preferably at least 1, up to 700 µm, more preferably up to 70 µm, yet more preferably up to 20 µm. The silica powder has a $SiO_2$ concentration of preferably at least 65, and preferably up to 84, weight-percent, a $Na_2O$ concentration of at least 5, more preferably at least 9, and even more preferably at least 10, weight-percent and, in a preferred embodiment, the silica powder also has a calcium oxide (CaO) concentration of at least 4, more preferably at least 5, and even more preferably at least 7, weight-percent. Preferably, the silica powder comprises a recycled glass powder. Recycled glass powder may, for instance, be sourced from post-consumer or industrial recycled glass, soda lime glass, float glass, windscreens, solar panels. Advantageously, the expandable silica particles thereby form an environmentally friendly material.

The expandable silica particle preferably comprises at least 0.85, more preferably at least 1, up to 10, more preferably up to 6, wt.-% of at least one expanding agent. The expanding agent may comprise a powder and, more preferably, is in the form of a powder. Preferably, the particles of the expanding agent powder have a diameter of at least 0.01 up to 40.0 µm. In a preferred embodiment, the particles of the expanding agent powder have a particle diameter range determined by sieving method of preferably at least 0.01 µm up to 40.0 µm, more preferably up to 10.0 µm, and yet more preferably up to 2.0 µm. The at least one expanding agent may comprise aluminum nitride (AlN), silicon carbide (SiC), manganese dioxide ($MnO_2$), limestone ($CaCO_3$), alumina ($Al_2O_3$) or combinations thereof. Preferably, the at least one expanding agent comprises silicon carbide powder. More preferably, the expanding agent is silicon carbide powder.

Optionally, the expandable silica particles may comprise silica fume, also referred to as microsilica, such as the silica fume known under the designations CAS 69012-64-2 and/or EINECS 273-761-1 and/or ultrafine quartz sand. The expandable silica particle preferably comprises at least 0.01, more preferably at least 1 up to 10, more preferably up to 4 wt.-% silica fume and/or ultrafine quartz sand. Silica fume comprises ultrafine silica particles with a particle diameter below 1 µm. Preferably, the diameter of the silica fume particles is around 150 nm. In a preferred embodiment, the silica fume particles have a particle size below 150 nm. The ultrafine quartz sand preferably has a particle size below 10 µm, more preferably below 1 µm. The silica fume particles and/or ultrafine quartz sand are preferably comprised of at least 85 weight-percent amorphous $SiO_2$ and preferably have less than 5 weight-percent, more preferably less than 1 weight-percent, $Na_2O$ and less than 4 weight-percent, more preferably less than 1 weight-percent, CaO. In a preferred embodiment, at least 80, more preferably at least 90, percent by weight of the silica fume and/or ultrafine quartz sand in the expandable silica particles is located below the surface of the expandable silica particles.

Advantageously, the silica fume and/or ultrafine quartz silica sand, acting as a reinforcement agent, strengthens the walls of the cells that are formed in the expandable silica particle during expansion. Due to the strengthened cell walls and due to the reduced occurrence of rupturing of cell walls on the surface, the resulting expanded silica particle has a higher strength and a higher crush resistance with significantly reduced water adsorption. In a preferred embodiment, at least 80, more preferably at least 90, percent by weight of the silica from the silica fume and/or ultrafine quartz silica sand in the expandable silica particles is located below the surface of the expanded silica particles.

The expandable silica particles preferably have a bulk density of at least 0.3, more preferably at least 0.5, up to 1.7, more preferably up to 1.5, kg/l. The expandable silica particles preferably have a diameter of at least 0.1 mm, more preferably at least 0.2 mm, more preferably at least 0.25 mm, and in some embodiments most preferably at least 0.8 mm, up to 40 mm, more preferably up to 16 mm, even more preferably up to 8 mm, yet more preferably up to 5.60 mm. In a preferred embodiment, the expandable silica particles have a particle size distribution measured according to the sieving method of UNI EN 933-1: 2012 of at least 0.25 mm up to 5.60 mm.

The expandable silica particle preferably comprises a coating having at least 0.5, more preferably at least 1 up to 10, more preferably up to 4 wt.-% kaolin powder ($Al_2SiO_5(HO)_4$) based on the total weight of the expandable silica particle with the coating. Advantageously, the kaolin acts as a release agent at temperatures above the softening point of the expandable silica particle. Thereby the risk of adhesion and/or merging of expanding silica particles to one another and/or to the furnace is further reduced. This is especially important for large production volumes, where numerous particles are expanded simultaneously. Nevertheless, endothermic dehydration of kaolin takes place in the temperature interval 560-950° C., producing metakaolin that will gradually reduce the effect of kaolin as a release agent. Therefore, the coating preferably further comprises talc powder ($Mg_3Si_4O_{10}(OH)_2$). The coating preferably comprises at least 0.5, more preferably at least 1 up to 5, more preferably up to 4 wt.-% talc powder based on the total weight of the expandable silica particle with the coating. The weight-ratio of talc powder to kaolin powder is preferably at least 1:20, more preferably at least 1:2 up to 10:1, more preferably up to 1:1. The expandable silica particles may be coated with a mixture of talc powder and kaolin powder. In a preferred embodiment, the expandable silica particles are first coated with talc powder and then coated with kaolin powder.

Advantageously, during expansion the talc powder partly melts into the surface of the expanding silica particle and renders the surface more elastic or flexible, thereby reducing the collapse of cells at the outer surface of the expanding silica particle. Consequently, the talc powder counteracts the adverse effect of kaolin, occurring at high temperatures, and acts to maintain the surface integrity of the expanding silica particle. Thereby, the resistance against fluid adsorption in the expanded silica particle is improved. The open porosity of the expanded silica particles made by expanding the coated expandable silica particles according to the invention, when measured according to ISO 5017, is preferably not greater than 12 percent, more preferably not greater than 10 percent.

Moreover, the compression strength of the expanded silica particles is improved when made from expandable silica particles coated with talc and kaolin relative to expanded silica particles made from expandable silica particles coated solely with kaolin and relative to expanded silica particles made from expandable silica particles coated solely with talc. The compressive strength of expanded silica particles made from expandable silica particles coated with kaolin and talc is preferably at least 1 MPa, more preferably 4 MPa, yet more preferably at least 7 MPa, and even more preferably at least 8 MPa. The inventors have found that, contrary to state-of-the-art materials, the compressive strength of the expandable silica particles tends to increase with increasing expandable silica particle size.

A method for preparing one or more expandable silica particles according to the disclosure is next described. The method comprises providing expandable silica particles comprising silica powder, at least one expanding agent and, optionally, silica fume and/or ultrafine quartz silica sand. Providing expandable silica particles preferably comprises sintering or heat-pressing a mixture of silica powder, at least one expanding agent and, optionally, silica fume and/or ultrafine quartz silica sand, into a sintered solid form, such as a block, at a temperature above the softening temperature of the silica powder and below the activation temperature of the at least one expanding agent. The sintered solid form, such as a block, may then be divided into expandable silica particles, for instance by cutting or by crushing the sintered solid form, such as a block, into granules. The granules may be screened according to size and large granules may be subjected to further dividing. Alternatively, the mixture of silica powder, at least one expanding agent and, optionally, silica fume and/or ultrafine quartz silica sand, may be heat-pressed directly into expandable silica particles. Further alternatively, the mixture of silica powder, at least one expanding agent and, optionally, silica fume and/or ultrafine quartz silica sand, may be provided with an inorganic liquid binder and processed in an industrial pelletizer into expandable silica particles.

In one aspect of the invention, the method for preparing one or more expandable silica particles comprises combining silica fume and/or ultrafine quartz silica sand with silica powder and expanding agent to form a mixture, sintering the mixture and granulating the sintered mixture to form expandable silica particles.

In another aspect of the invention, the method comprises providing expandable silica particles including, but not limited to the silica particles obtainable by the above method for making expandable silica particles and coating the outer surface of the expandable silica particle with talc and kaolin, to thereby form an expandable silica particle having a talc and kaolin coating. The coating step is preferably dry-coating the outer surface of the expandable silica particle with talc powder and kaolin powder, wherein talc powder is preferably applied before applying kaolin powder.

Figure 1:
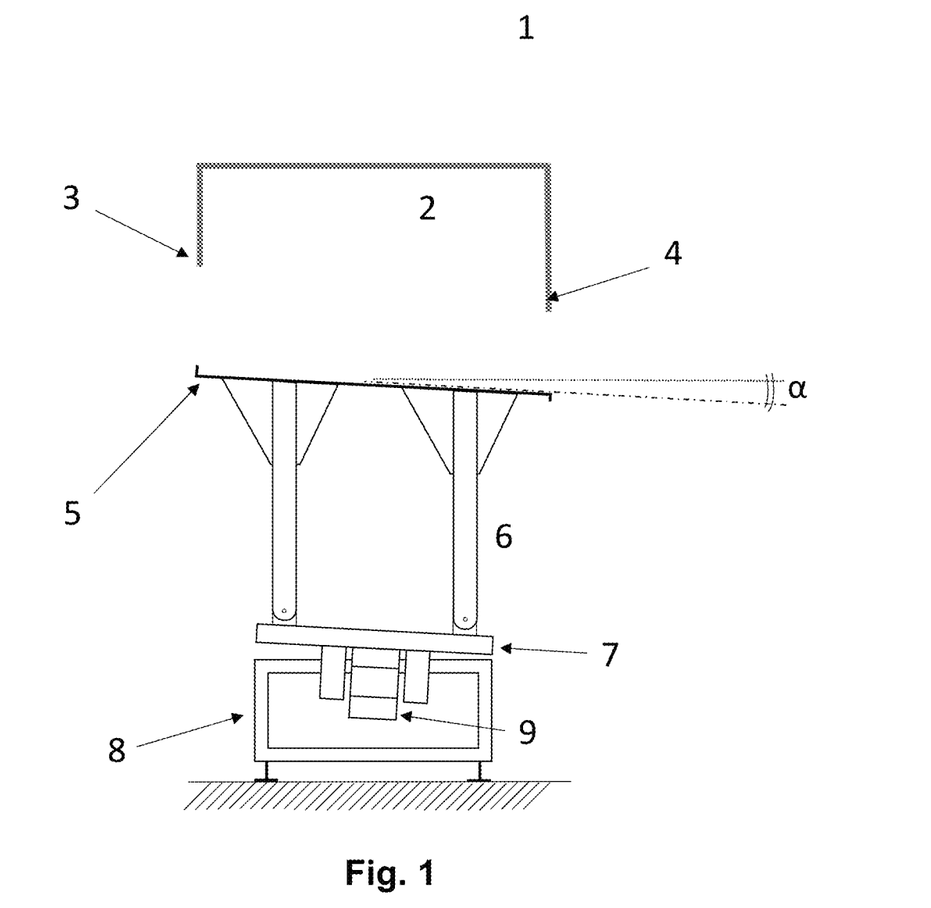
FIG. 1 schematically shows a longitudinal cross-section of a furnace according to the disclosure.
Figure 2:
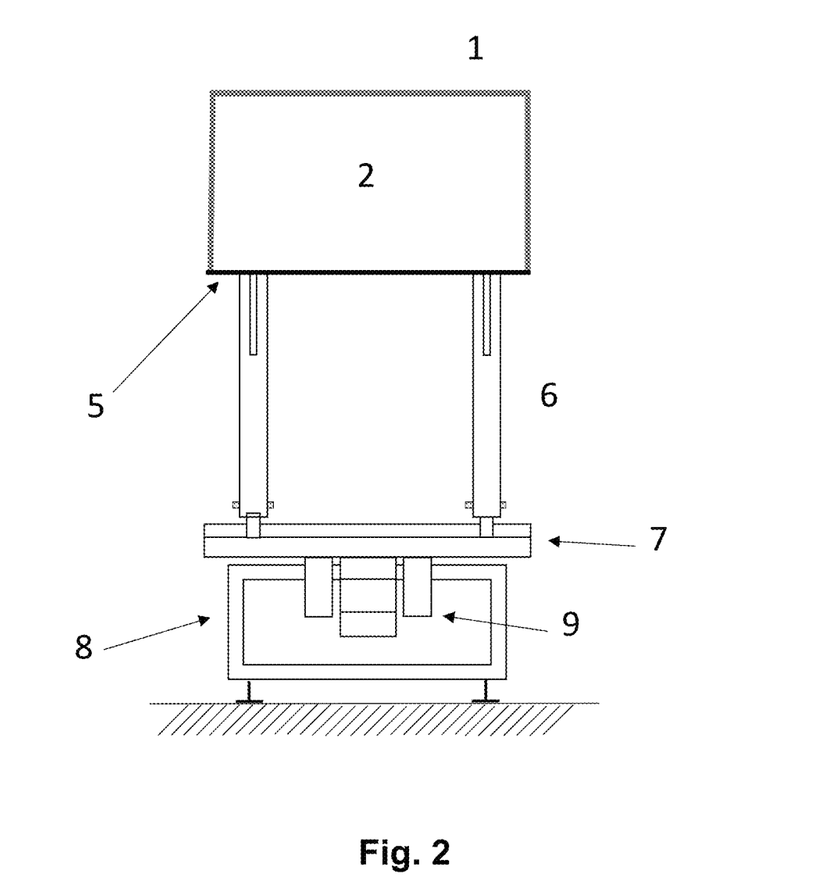
FIG. 2 schematically shows a transversal cross-section of a furnace according to the disclosure.

A method for producing expanded silica particles comprises providing a plurality of expandable silica particles, preferably a plurality of expandable silica particles according to the invention, and heating the expandable silica particles, such as in a chamber 2 of a furnace 1 of FIGS. 1 and 2, to above the activation temperature of the expanding agent to form expanded silica particles. The expandable silica particles may be fed into the chamber 2 (schematically shown in FIG. 1) by a feeding system. In the chamber 2, the expandable silica particles may be fed onto an angled, vibrating plate body. A directional, high frequency motion may thereby be induced in the expandable silica particles, wherein the motion may be chaotic and preferably creates a fluidized bed of particles.

Preferably, the expandable silica particles may first undergo pre-heating before exposure to a temperature above the activation temperature of the expanding agent, such as by feeding the expandable silica particles into a preheating chamber, preferably at a temperature below the softening temperature of the expandable silica particles, before feeding or conveying the expandable silica particles into the chamber 2. Advantageously, the pre-heating step reduces the temperature difference between the core and the surface of the expandable silica particles during expansion creating a more uniform cell size distribution inside the expanded silica particle.

The expandable silica particles are heated to above the activation temperature of the expanding agent, such as in chamber 2 of the furnace in FIGS. 1 and 2, to a temperature of at least 800° C., more preferably at least 850° C. up to 950° C., and in some embodiments more preferably up to 900° C. During heating, the expandable silica particles are softened.

Above the activation temperature of the expanding agent, the decomposition of the expanding creates one or more gases driving expansion of the softened particles. Advantageously, a coating is preferably present on the outer surface of the expandable silica particles according to the invention which isolates the outer surface during exotherm-driven expansion when SiC is used as the expansion agent and increases the viscosity on the surface compared to the core of the expanding particle. Thereby, the expansion process is counteracted at the surface of the expanding silica particles, resulting in a denser outer surface of the expanded silica particles, with less open cells as compared to particles without coating.

Within the chamber 2 of the furnace according to FIGS. 1 and 2, the temperature and the residence time may be controlled, thereby controlling the expansion rate of the expandable silica particles. The residence time may be controlled by controlling the conveying speed of the particles in the chamber 2. Thereby, expanded silica particles are produced.

Preferably, the expanded silica particles preferably have a bulk density of at least 150 up to 900 g/l. The expanded silica particles may comprise an almost sealed, closed cell structure at the surface and a cellular structure with mostly closed cells in the interior. Preferably, the expanded silica particles have a spherical or close to spherical shape. The expanded silica particles preferably have a water adsorption determined according to UNI EN 1097-6:2013 (appendix C— adsorption after 5 minutes) of less than 20 weight-percent, more preferably less than 10 weight-percent, and even more preferably less than 7 weight-percent.

The expanded silica particles preferably have a particle size distribution in the range from 0.14 mm, more preferably at least 0.3 mm up to 60 mm, more preferably up to 45 mm, yet more preferably up to 16 mm, and even yet more preferably up to 8 mm, determined according to the sieving method of UNI EN 933-1: 2012. In one preferred embodiment, the expanded silica particles have a particle size of at least 2 mm. In a particularly preferred embodiment, the expanded silica particles have a weight-average particle size of at least 0.3 mm, more preferably at least 2 mm, up to 16 mm, more preferably up to 8 mm.

In one aspect of the invention, expanded silica particles are made by feeding expandable silica particles to at least one vibration plate while heating the expandable silica particles to a temperature above the activation temperature of the expanding agent to form expanded silica particles, wherein the vibration plate is vibrated by a vibration engine, such as illustrated in FIG. 1, wherein the furnace 1 comprises a vibration plate 5, forming the bottom of the chamber 2. The vibration plate, such as vibration plate 5 in FIG. 1, is preferably inclined by an inclination angle, shown as a in FIG. 1, which is preferably inclined with respect to the horizontal direction by at least 0.1°, more preferably at least 1°, up to 25°, more preferably up to 10°. In one preferred embodiment, the inclination angle of the vibration plate is about 3°.

A directional, chaotic motion is induced in the silica particles by vibration of the vibration plate, such as vibration plate 5 of FIGS. 1 and 2. The directional, chaotic motion preferably forms a fluidized bed of silica particles. Vibration of the vibration plate may be driven by one or more vibration engines, such as the at least one vibration engine 9 in FIGS. 1 and 2. The vibration engines each preferably apply vibrational energy to the underside of the vibration plate, the vibrational energy having a frequency of vibration, a stroke length and a stroke angle via mechanical engagement between the vibration engines and the vibration plate. The vibration preferably has a frequency of at least 25 Hz, preferably at least 28 Hz up to 75 Hz, more preferably up to 50 Hz. During vibration, the vibration plate, such as vibration plate 5 of FIGS. 1 and 2, preferably has a maximum acceleration of at least 3 g and preferably has a maximum acceleration of 8 g. The at least one vibration engine, such as vibration engine 9 of FIGS. 1 and 2, preferably has a stroke length of at least 1 mm up to 7 mm, more preferably up to 5 mm. In one embodiment, the at least one vibration engine 9 has a stroke angle with respect to the vertical direction of 0-45°, preferably 10-35°, most preferably 30°. In a preferred embodiment, the at least one vibration engine preferably has a stroke angle with respect to the vertical direction, oriented from the entry toward the exit of the furnace, of at least 0°, preferably greater than 0°, more preferably at least 5°, up to 45°, and more preferably up to 35°. In one embodiment, the stroke angle is most preferably about 10°.

The vibration plate, such as vibration plate 5 in FIGS. 1 and 2, is vibrated during the heating and expansion of the expandable silica particles. The chaotic component of the motion arises due to the silica particles bouncing in irregular or chaotic fashion off the vibration plate, such as vibration plate 5, and falling back due to gravity. The silica particles may reach a height above the surface of the vibration plate of at least 1 mm, more preferably at least 5 mm, up to 40 mm, more preferably up to 15 mm, in the surface normal direction. At vibration frequencies below 25 Hz, and at a maximum acceleration below 3 g, it was found that the chaotic motion becomes an oscillating, regular motion. It was further found that during this regular motion most silica particles move synchronously, thereby increasing the inter-particle contact time and increasing the risk for adhesion of particles to one another.

The directional component of the motion is in the surface parallel direction of the vibration plate, such as vibration plate 5 in FIGS. 1 and 2. The directional component is mainly controlled by the inclination angle, the frequency and/or the stroke angle. The directional component assures the transport of the silica particles during heating, such as through the chamber 2 from the entry 3 to the exit 4 in FIG. 1, for example. Preferably, the silica particles move with an average speed of at least 0.01 up to 0.2 m/s, more preferably about 0.15 m/s, and in another embodiment from 0.01 to 0.1 m/s, from entry into a furnace chamber to exit from the furnace chamber, such as from the entry 3 to the exit 4 in FIG. 1. Preferably, each and every difference in acceleration between any two points on the vibration plate, such as vibration plate 5 in the furnace 1 in FIGS. 1 and 2, is at most 1.5 g, preferably at most 1 g. Advantageously, by minimizing the difference in acceleration between any two points on the vibration plate 5, a uniform directional component is achieved.

Figure 3A:
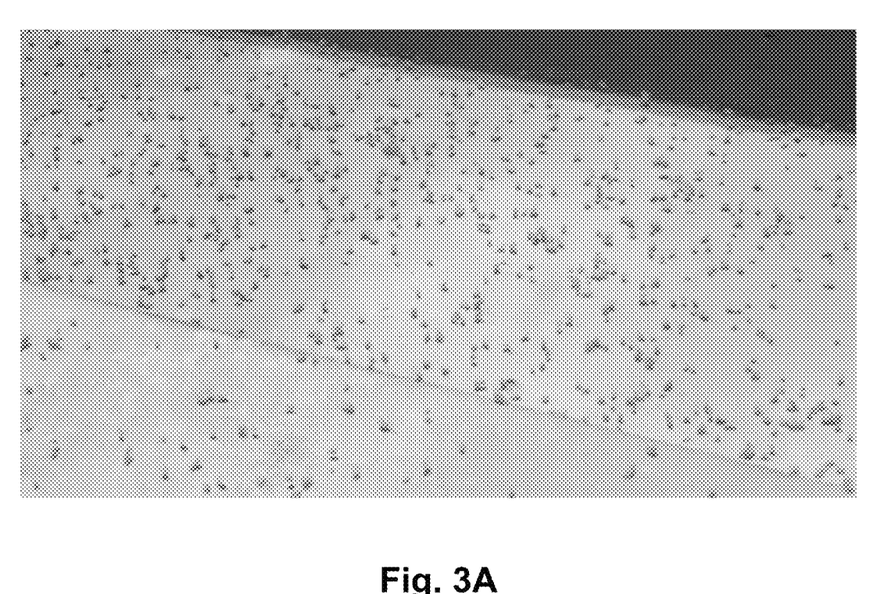
FIG. 3A shows an angled top-view photograph of silica particles on a vibration plate.
Figure 3B:
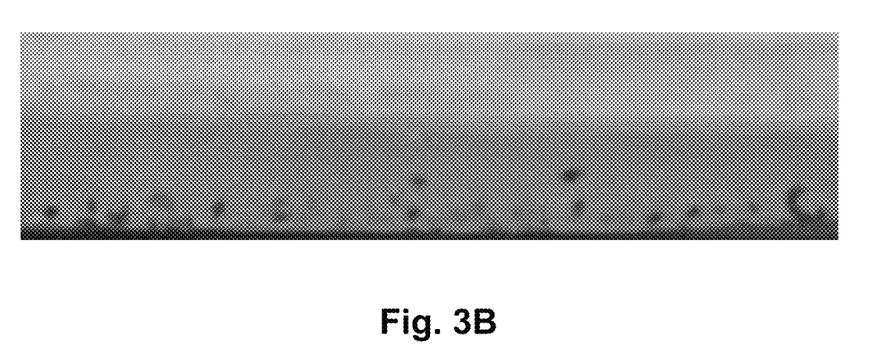
FIG. 3B shows a side-view photograph of silica particles on a vibration plate.

An example of silica particles in directional, chaotic motion on a vibration plate at ambient temperature is shown in FIG. 3A, displaying an angled top-view photograph of the vibration plate. Silica particles in motion above the vibration plate show in light grey and the shadows of these particles on the vibration plate show in dark grey. A side view of silica particles in a state of directional, chaotic motion over a vibration plate at a temperature of 850° C. is shown in FIG. 3B. Clearly, in each case most particles are suspended above the vibration plate.

The directional, chaotic motion preferably allows the silica particles to remain suspended above the vibration plate, such as the vibration plate 5 in FIGS. 1 and 2, for at least 85% of the residence time of the silica particles in the furnace. Thereby, the contact time between silica particles in the furnace, such as furnace 1 in FIGS. 1 and 2, is preferably limited to at most 40 milliseconds, more preferably at most 28 milliseconds. By limiting the contact time between the silica particles, the risk for adhesion of particles to one another and for particle merging is minimized. The required vibration frequency is inversely proportional to the particle diameter; larger silica particles require lower vibration frequencies and smaller silica particles require higher vibration frequencies, to limit the contact time between the silica particles. Furthermore, by mainly maintaining the silica particles suspended above the vibration plate, the contact time between the silica particles and the vibration plate is limited. Thereby the risk of adhesion of softened silica particles to the vibration plate is minimized.

It has been found that by subjecting silica particles in the furnace to vibration at a high frequency and with a high maximum acceleration, a directional, chaotic motion is induced in the silica particles, as detailed below. Thereby adhesion of softened silica particles to one another is significantly reduced, due to significantly reduced inter-particle contact times. Additionally, adhesion of the softened silica particles to the furnace is reduced, due the reduced contact times between particles and the furnace floor.

Upon exiting the furnace, such as the furnace 1 in FIGS. 1 and 2, the expanded silica particles may enter a cooling zone, comprising one or more stages kept at progressively lower temperatures. The expanded silica particles are preferably cooled to ambient temperature in the cooling zone, allowing further handling of the expanded silica particles. Within the cooling zone, the temperature and the residence time for each stage may be controlled, thereby controlling the cooling rate of the expanded silica particles. Advantageously, internal tension within the expanded silica particles due to differential cooling rates at the particle surface and in the particle-interior may thereby be minimized. Following cooling, the expanded silica particles may be coated with a sodium silicate solution, also known as water glass, preferably at a temperature of 0.1-200° C. Advantageously, the sodium silicate solution further reduces surface porosity of the expandable silica particles, thereby improving resistance against fluid adsorption in the expanded silica particle.

The expanded silica particle may be used as a filler in matrix material such as concrete or other hydraulic binder, plaster, gypsum, mortar, geopolymer, one- or two-component epoxy, polyurethane, acrylate or another suitable organic binder, as a loose fill aggregate such as in insulation or in artificial turf or as a filler in water filtration cartridges. Advantageously, the expanded silica particle has a significantly reduced fluid adsorption capacity and may, for instance, adsorb a negligible amount of concrete additives when used as a filler in a concrete matrix material.

A furnace 1 for expanding silica particles according to the disclosure is schematically shown in longitudinal cross-section in FIG. 1 and in transversal cross-section in FIG. 2. Same features are denoted by the same reference signs in FIGS. 1 and 2. The furnace 1 comprises a chamber 2, comprising an entrance 3 and an exit 4. The chamber comprises sidewalls, a roof and a bottom. The bottom comprises a vibration plate 5. The furnace 1 also comprises a feeding system connected to the entrance 3. The feeding system may comprise a vibration feeder, a conveyor belt feeder, a hopper or a high-pressure airflow feeder. The furnace 1 comprises one or more heating components, such as electrically driven or gas driven heating elements. The one or more heating components are configured to heat the chamber 2 to a temperature of at least 800° C., more preferably at least 850° C. up to 950° C., and in some embodiments up to 900° C. The furnace 1 may further comprise a cooling zone, connected to the exit 4. The cooling zone may comprise cooling component, such as air-jet cooling elements or spray mist cooling elements. In operation, expandable silica particles may be fed by the feeding system through the entrance 3 and into the chamber 2. The expandable silica particles may then be heated, softened and expanded in the chamber 2. Expanded silica particles may then exit the chamber 2 through the exit 4 and into the optional cooling zone.

The furnace 1 may further comprise a support 6, supporting the vibration plate 5. The support 6 may comprise one or more legs (two legs are shown in the side view of FIG. 1), preferably four legs, most preferably six legs. The support 6 may be independently different in height, such that the vibrating plate 5 may be inclined at a desired angle with respect to the horizontal direction. The support 6 may be hingedly connected or welded to the vibration plate 5. The furnace 1 may further comprise a support plate 7 on which the support 6 may be mounted. The furnace 1 may also comprise a base 8, on which the support plate 7 may be mounted. The base 8 may be adjustable in height, to maintain the vibration plate 5 in an inclined position with respect to the horizontal direction. Preferably, the support plate 7 is connected to the base 8 with springs, Thereto, the support plate 7 may comprise a tilting mechanism for the vibrating engines (not shown), configured to adjust the inclination angle of the vertically oriented vibrating stroke with respect to the horizontal direction.

The vibration plate 5 is preferably inclined with respect to the horizontal direction (inclination $\alpha$ between dotted line and dash-dotted line in FIG. 1) by at least 0.1°, more preferably at least 1°, up to 25°, more preferably up to 5°. In one preferred embodiment, the inclination angle of the vibration plate is about 3°. The vibration plate 5 is inclined from the entry 3 downward to the exit 4. Advantageously, the vibration plate is thereby configured for conveying silica particles from the entrance to the exit preferably in a vibratory fluidized bed motion. The vibration plate 5 may be inclined by adjusting the length of the support legs 6.

The vibration plate 5 may have the form of a plate. Alternatively, the vibration plate 5 may comprise a tray comprising a rectangular bottom with longitudinal sidewalls and/or transversal sidewalls. The vibration plate has an area of preferably at least 0.25 m$^2$ up to preferably 5 m$^2$ and preferably has a rectangular or trapezoid shape. Preferably, the vibration plate 5 has a length of 900 mm (from left to right in FIG. 1) and a width of 700 mm. The vibration plate 5 is configured to withstand cyclical oxidation and metallurgical changes at temperatures of at least 900° C. The vibration plate 5 is further configured to withstand stress due to vibration with a frequency of at least 25 Hz. Preferably, the vibration plate 5 comprises a heat-resistant steel. The vibration plate 5 may be coated with a non-oxidizing coating. In addition, the vibration plate 5 may be coated with one or more release agents. Advantageously, the risk of adhesion of softened silica particles to the vibration plate 5 is thereby reduced.

The furnace 1 comprises at least one vibration engine 9, configured to drive vibration of the vibration plate 5. Preferably, the furnace 1 comprises two vibration engines 9, configured such that the rotational directions of the two vibration engines 9 are opposed to one another. Advantageously, the at least one vibration engine 9 delivers a directional linear vibration energy to the vibration plate. The at least one vibration engine 9 may be fixed to the support plate 7. The at least one vibration engine 9 is preferably configured to vibrate the vibration plate 5 with a frequency of at least 25 Hz, more preferably at least 28 Hz, up to 75 Hz, more preferably up to 50 Hz. Furthermore, the vibration engine 9 is preferably configured to vibrate the vibration plate 5 with a maximum acceleration of at least 3 g and preferably up to 8 g, where g denotes the gravitational constant. The maximum acceleration of the vibration plate 5 equals $2*\pi^2*(frequency)^2*stroke+g$. The at least one vibration engine 9 preferably has a stroke of at least 1 up to 7 mm, more preferably up to 5 mm. The at least one vibration engine 9 preferably has a stroke angle with respect to the vertical direction of at least 0°, more preferably greater than 0°, even more preferably at least 10°, up to 45°, and more preferably up to 35°. In one embodiment, the stroke angle is most preferably about 30°. In another embodiment, the stroke angle is most preferably about 10°. Advantageously, the combination of high vibration frequency and high maximum acceleration cause the silica particles in the chamber of the furnace to enter a state of directional, chaotic motion, as detailed below. Thereby, contact times between silica particles in the furnace and between the particles and the furnace itself are significantly reduced. Consequently, the risk of adhesion of softened particles to one another or to the furnace is reduced.

The furnace 1 may comprise one or more control devices. The control devices may control the feeding system, the tilting mechanism on the support 6, the tilting mechanism of the support plate 7, the at least one vibrating engine 9, the one or more heating components and/or the cooling zone. The control devices may be configured to control the at least one vibration engine 9 by controlling the stroke, the stroke angle and/or the vibration frequency. The one or more control devices may comprise a CPU, a display and/or a user input device such as a keyboard or a touchscreen. The one or more control devices may also comprise one or more sensors (not shown), such as temperature sensors, pressure sensors and/or optical sensors. The one or more sensors may be connected to the CPU, to facilitate monitoring of the operation of the furnace 1. Preferably, one or more sensors are located in the chamber 2. Advantageously, operating parameters can thereby be adjusted during operation of the furnace to control or optimize the silica particle expansion process.

Example 1

Expandable silica particles were provided comprising a sintered mixture of recycled glass powder and SiC powder as an expanding agent. The diameter of the expandable silica particles was 1-2 mm and the bulk density of the expandable silica particles was 1100 g/l. The expandable silica particles were coated with kaolin powder. The expandable silica particles were fed into the chamber of a furnace according to the disclosure and onto a vibration plate. The vibration plate was inclined with respect to the horizontal direction with an inclination angle of 3°. The vibration plate was driven by a vibration engine to vibrate at a frequency of 43 Hz. At ambient temperature, the vibration plate had a maximum acceleration of 4.8-5.2 g during vibration. In the chamber of the furnace, the expandable silica—particles were heated to a temperature of 850° C. At this temperature, the expandable silica particles were softened, and the expanding agent was activated to expand the silica particles. The directional, chaotic motion induced by the vibration plate, caused the silica particles to remain suspended in the air above the vibration plate for at least 85% of the residence time in the furnace. The silica particles moved over the vibration pate from the entry towards the exit of the furnace, with an average speed of 0.07 m/s. No adhesion of particles to one another or merging of particles was observed.

Example 2

Expandable silica particles were provided by sintering 95 wt.-% of silica powder, 3 wt.-% of SiC powder expanding agent and 2 wt.-% of silica fume at 710° C. into a block. The silica powder comprises recycled flat glass. The SiC powder had a particle diameter below 2 μm. The sintered block was then crushed into expandable particles, which were filtered according to particle diameter. The expandable particles were dry-coated with a coating comprising talc powder and kaolin powder, to form coated expandable silica particles. The coated expandable silica particles comprised 91.2 wt.-% of silica powder, 2.88 wt.-% of SiC powder, 1.92 wt.-% of silica fume, 2 wt.-% kaolin powder and 2 wt.-% talc powder. The coated expandable silica particles were preheated at 680° C. for a period of 300 seconds, before being heated to 870° C. for 36 seconds. Heating was then continued at 865° C. for 45 seconds and at 860° C. for 45 seconds, before cooling commenced, at 200° C. for 18 seconds. The resulting expanded silica particles had a bulk density (determined according to UNI EN 1097-6:2013, appendix C) of 275 g/l and a diameter (determined according to sieving method of UNI EN 933-1: 2012) of 2-8 mm. Crushing resistance of the expanded silica particles, determined according to UNI EN 13055-1:2003, appendix A, par. 4.10, was measured to be 6.19 N/mm². Water adsorption determined according to UNI EN 1097-6:2013 (appendix C— adsorption after 5 minutes) was measured to be 4.4%.

Comparative Example

Expandable silica particles were provided by sintering 97 wt.-% of silica powder and 3 wt.-% of SiC powder expanding agent at 710° C. into a block. The silica powder comprised recycled flat glass. The SiC powder had a particle diameter of 0.01-2 μm. The sintered block was then crushed into expandable particles, which were filtered according to particle diameter. The expandable particles were then dry-coated with a coating comprising kaolin powder, to form coated expandable silica particles. The coated expandable silica particles comprised 93.12 wt.-% of silica powder, 2.88 wt.-% of SiC expanding agent and 4 wt.-% of kaolin coating. The expandable silica particles were heated and cooled according to the same regime as in Example 1. Bulk density, particle diameter, water adsorption and crushing resistance were determined according to the same standards as cited for Example 1. The resulting expanded silica particles had a particle diameter of 2-8 mm, a bulk density of 300 g/l for the segment with particle diameters of 2-4 mm and a bulk density of 275 g/l for the segment with particle diameters of 4-8 mm. The expanded silica particles had a water adsorption of 24.2% for the segment with particle diameters of 2-4 mm and of 21.9% for the segment with particle diameters of 4-8 mm. Finally, the expanded silica particles in the comparative example had a crushing resistance of 3.5 N/mm² for the segment with particle diameters of 2-4 mm and of 2.7 N/mm² for the segment with particle diameters of 4-8 mm.

Example 3

Sample Preparation

Four groups of samples of expandable silica particles with a particle size distribution of 3-5.6 mm and a weight of about 100 g have been collected randomly from sintered glass having the compositions shown in Table 1 below:

TABLE 1

| Composition | Recycled float glass (wt.-%) | SiC (wt.-%) | Silica fume (wt.-%) |
|---|---|---|---|
| Sintered samples (1-4) | 94.8 | 3.2 | 2 |

All expandable silica particles were made by uniformly mixing (a) recycled float glass powder received from Art Glass Recycling with the size distribution of 0-72 µm, (b) SIKA, which is silicon carbide (SiC) powder from Fiven Norge As having a size distribution of 0-2 µm (50% of particles are less than 1 µm), and (c) Elkem Microsilica 971-U (U stands for undensified), which is silica fume from Elkem As in the amounts shown in the above Table 1.

The mixture was sintered in an oven at a temperature of 710° C., which is below the activation temperature of SiC, for 15 minutes. After sintering, the sintered materials were crushed to form expandable silica particles. The particles were sieved so as to have a particle size distribution in the above-stated 3-5.6 mm range.

As shown in Table 2 below, Sample 1 has no coating and was used as a reference while Samples 2 and 3 were dry coated with 4 wt.-% kaolin powder and 4 wt.-% talc powder, respectively. Sample 4 was dry coated with 2 wt.-% talc powder and 2 wt.-% kaolin powder. The talc powder was A.PRO obtained from Karo Pharma As, which is pure talc without additives. The kaolin powder was CC50 Puraflo obtained from Sibelco Nordic AB which has a kaolin powder particle size distribution in the range from 0-20 µm.

TABLE 2

| Sample | Weight (g) | Talc (wt.-%) | Kaolin (wt.-%) |
|---|---|---|---|
| 1 | 100 | 0 | 0 |
| 2 | 100 | 0 | 4 |
| 3 | 100 | 4 | 0 |
| 4 | 100 | 2 | 2 |

Figure 4:
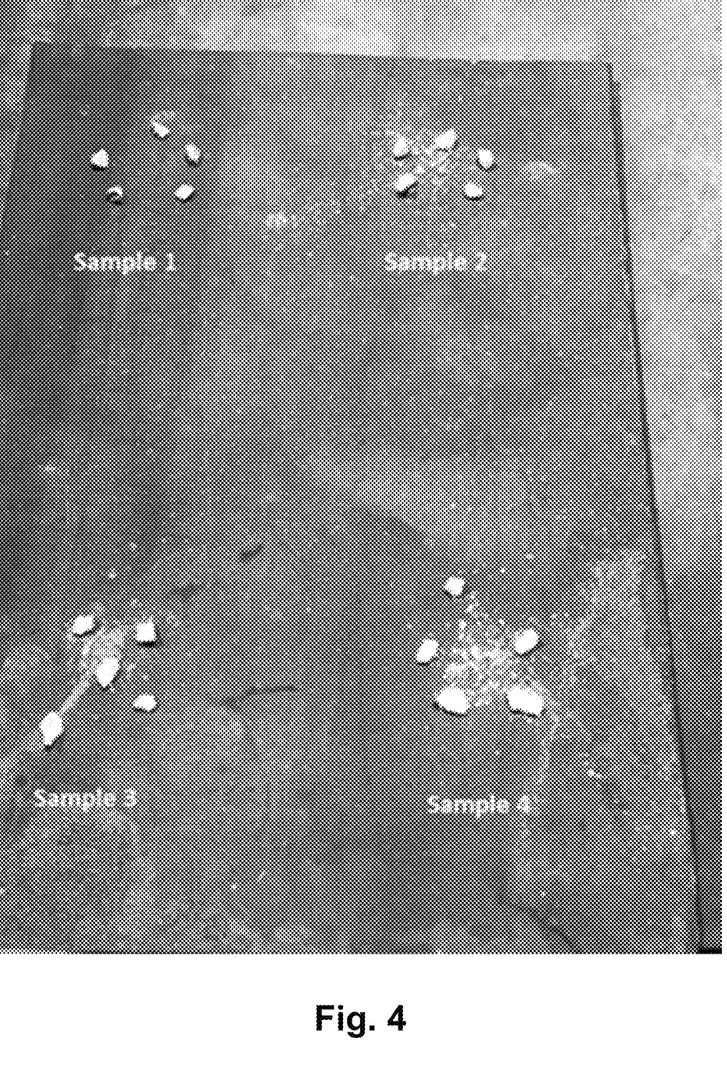
FIG. 4 shows a steel plate with samples of expandable silica particles according to Example 3 of the invention.
Figure 5:
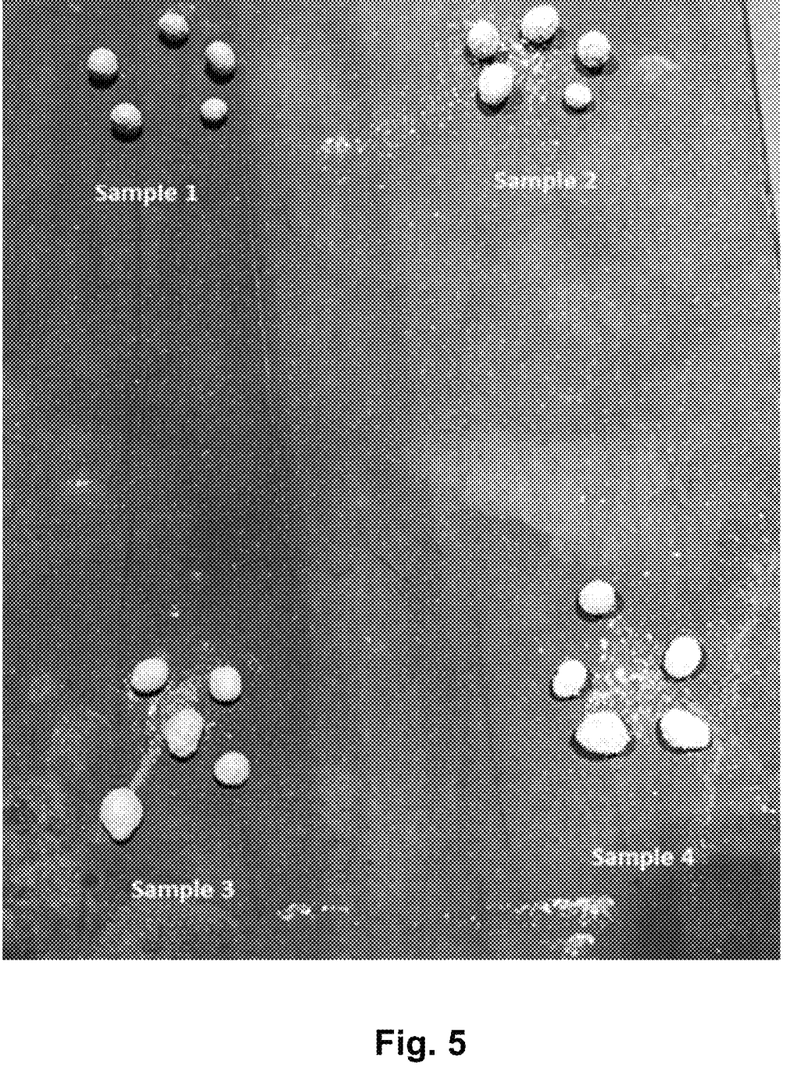
FIG. 5 shows the steel plate of FIG. 4 after expansion of the samples of expandable silica particles of Example 3 of the invention via heat treatment in a furnace.

To simulate particles behavior in a foaming kiln, five particles of each sample were placed on a steel plate (see FIG. 4) and furnace was set to 885° C. When the furnace reached 885° C., the plate was inserted into the furnace. The temperature of the furnace dropped by about 100° C. and it took around 5 minutes to reach 885° C. again. This time has been considered as particles pre-heating. The samples were kept for 3 minutes at 885° C. FIG. 5 shows the expanded silica particles after heat treatment. To confirm the reproducibility of the experiments, the above heat treatment experiments were performed 4 times, so that a total of 20 heat-treated particles for each of samples 1 to 4 in Table 2 above were produced.

Open Porosity Measurements

The open porosity on the surface of Samples 1 to 4, each comprising three particles selected at random from among the twenty heat-treated particles with no coating (Sample 1), kaolin powder coating (Sample 2), talc powder coating (Sample 3) and kaolin powder and talc powder coating (Sample 4) prepared according to the above method was determined according to ISO 5017. In this method, the dry mass of a porous particle was measured and named as $m_1$. The mass of the sample when fully impregnated with water and the fully impregnated mass whilst suspended in water are $m_2$ and $m_3$ respectively. The open porosity is calculated according to Equation 1 below:

$$\text{Open porosity } (\%) = \frac{m_2 - m_1}{m_2 - m_3} \times 100. \qquad \text{Eq. 1}$$

The open porosity values together with average open porosity and standard deviation are shown in Table 3 below:

TABLE 3

| | Percent Open Porosity | | | |
|---|---|---|---|---|
| | Sample 1 | Sample 2 | Sample 3 | Sample 4 |
| Particle 1 | 12.8 | 13.1 | 15 | 9.7 |
| Particle 2 | 16.9 | 14.7 | 16.7 | 8.7 |
| Particle 3 | 15 | 9.1 | 17.3 | 8.4 |
| Average | 14.45 | 12.3 | 16.3 | 8.93 |
| STD* | 1.9 | 2.8 | 1.19 | 0.68 |

Compressive Strength Measurements

Compressive strengths of the expanded silica particles with different coatings (sample 1 without coating, sample 2 with kaolin as coating and sample 3 with talc and sample 4 with mixture of kaolin and talc) were investigated using a materials testing machine known as Z2.5 test Control II made by Zwick/Roell in Ulm, Germany. Compression was carried out with a constant feed of 1 mm min⁻¹. The compression force and compaction distance were collected by testXpert II software also provided by the manufacturer Zwick/Roell. The first major drop in compression force was allocated to particle breakage. The sample surface area was measured manually using a caliper. The compaction force divided by surface area (N/mm²) equals the compressive strength (MPa).

The results of compressive strength measurements made on seven particles randomly selected from the expanded silica particles are reported in Table 3 below. The respective average compressive strength and standard deviation for each sample are also presented in Table 3 below.

TABLE 3

| | Compressive strength of samples | | | | | | | | |
|---|---|---|---|---|---|---|---|---|---|
| | Compressive Strength of each Particle in MPa | | | | | | | Average | STD * |
| Sample | 1 | 2 | 3 | 4 | 5 | 6 | 7 | (MPa) | (MPa) |
| 1 | 0.72 | 1.09 | 1.92 | 1.36 | 1.3 | 1.3 | 1.5 | 1.31 | 0.37 |
| 2 | 6.06 | 4.9 | 7.07 | 6.04 | 6.13 | 6.4 | 5.15 | 5.96 | 0.74 |
| 3 | 4.3 | 5.2 | 5.8 | 4.2 | 4.3 | 3.1 | 5.8 | 4.67 | 0.98 |
| 4 | 8.5 | 8.9 | 10 | 8.5 | 9.9 | 9.1 | 8.2 | 9.01 | 0.70 |

* "STD" means standard deviation

LIST OF REFERENCE CHARACTERS IN THE DRAWINGS 1 furnace
2 chamber
3 furnace entry
4 furnace exit
5 vibrating plate
6 support
7 support plate
8 base
9 vibration engine

What is claimed is:

1. An expandable silica particle comprising:
a sintered or heat-pressed mixture comprising silica powder, at least one expanding agent and silica fume and
a coating on the outer surface of the expandable silica particle comprising talc powder and kaolin powder,
wherein the expandable silica particle comprises 50 to 98 wt.-% of the silica powder, 0.85 to 10 wt.-% of the at least one expanding agent and 0.01 to 10 wt.-% of the silica fume.

2. The expandable silica particle according to claim 1, wherein the at least one expanding agent is silicon carbide powder.

3. The expandable silica particle according to claim 1, wherein the silica powder is recycled glass.

4. An expandable silica particle comprising:
a sintered or heat-pressed mixture comprising silica powder and at least one expanding agent and a coating on the outer surface of the expandable silica particle comprising talc powder and kaolin powder, wherein the expandable silica particle comprises from 1 wt.-% to 6 wt.-% of at least one expanding agent in the form of a powder, and a coating comprising from 1 wt.-% to 10 wt.-% kaolin and from 1 wt.-% to 4 wt.-% talc.

5. The expandable silica particle of claim 4 further comprising from 1 wt.-% to 4 wt.-% silica fume or ultrafine quartz.

6. The expandable silica particle of claim 4, wherein the expanding agent is silicon carbide powder.

7. The expandable silica particle of claim 5, wherein the expanding agent is silicon carbide powder.

8. The expandable silica particle of claim 4, wherein the silica powder is recycled glass.

9. The expandable silica particle of claim 7, wherein the silica powder is recycled glass.

* * * * *